(12) United States Patent
Rittweger et al.

(10) Patent No.: US 12,090,796 B2
(45) Date of Patent: Sep. 17, 2024

(54) PNEUMATIC VEHICLE TIRE HAVING A HATCHED SURFACE

(71) Applicant: Continental Reifen Deutschland GmbH, Hannover (DE)

(72) Inventors: Stefan Rittweger, Garbsen (DE); Juraj Jurco, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 168 days.

(21) Appl. No.: 17/595,695

(22) PCT Filed: Apr. 8, 2020

(86) PCT No.: PCT/EP2020/059959
§ 371 (c)(1),
(2) Date: Nov. 22, 2021

(87) PCT Pub. No.: WO2020/239307
PCT Pub. Date: Dec. 3, 2020

(65) Prior Publication Data
US 2022/0219496 A1  Jul. 14, 2022

(30) Foreign Application Priority Data
May 29, 2019 (DE) .................. 10 2019 207 943.1

(51) Int. Cl.
*B60C 13/02* (2006.01)
*B60C 13/00* (2006.01)

(52) U.S. Cl.
CPC ............ *B60C 13/001* (2013.01); *B60C 13/02* (2013.01)

(58) Field of Classification Search
CPC ..... B60C 13/00; B60C 13/001; B60C 13/002; B60C 13/02; B60C 13/023; B60C 15/024
See application file for complete search history.

(56) References Cited

U.S. PATENT DOCUMENTS

| 5,263,525 A | 11/1993 | Yamashita |
| 2010/0000649 A1 | 1/2010 | Iwabuchi |

(Continued)

FOREIGN PATENT DOCUMENTS

| DE | 69202013 T2 | 8/1995 |
| DE | 102012105864 A1 | 2/2014 |

(Continued)

OTHER PUBLICATIONS

Chinese Office Action dated Feb. 16, 2023 for the counterpart Chinese Patent Application No. 202080040265.8 and translation of same.

(Continued)

*Primary Examiner* — Justin R Fischer

(57) ABSTRACT

A pneumatic vehicle tire (1) having sidewalls (2) and having a tread (3) and having at least one hatching area (4) on at least one of the sidewalls (2) and/or on the tread (3), wherein the hatching area (4) has mutually adjacently arranged hatching elements (5), wherein each hatching element (5) has a hatching rib (51).

The problem addressed is that of influencing the contrast effect in even more targeted fashion, and further increasing the contrast effect. It is furthermore sought to allow improved ventilation capability during the production of the tire by means of a vulcanization mold.

This is achieved in that each hatching element (5) has short transverse elevations (53), which cross the hatching rib (51) in crossing regions (52), wherein the short transverse elevations (53) cross in each case exactly one hatching rib (51).

18 Claims, 5 Drawing Sheets

(56) References Cited

U.S. PATENT DOCUMENTS

2014/0216622 A1    8/2014  Muhlhoff et al.
2014/0326385 A1   11/2014  Sato
2015/0321523 A1*  11/2015  Takahashi .............. B60C 13/02
                                                    152/523

FOREIGN PATENT DOCUMENTS

| DE | 112012004764 T5 | 11/2014 |
| EP | 2090444 A1 | 8/2009 |
| WO | 2012171802 A1 | 12/2012 |
| WO | 2013073128 A1 | 5/2013 |
| WO | 2014005784 A1 | 1/2014 |

OTHER PUBLICATIONS

European Examination Report dated Apr. 12, 2023 for the counterpart European Patent Application No. 20 720 374.6 and translation of same.
Chinese Office Action dated Dec. 23, 2023 corresponding to Chinese Patent Application No. 202080040265.8.

* cited by examiner

PNEUMATIC VEHICLE TIRE HAVING A HATCHED SURFACE

The invention relates to a pneumatic vehicle tire having sidewalls and having a tread and having at least one hatching area on at least one of the sidewalls and/or on the tread, wherein the hatching area has mutually adjacently arranged hatching elements, wherein each hatching element has a hatching rib.

Such hatching areas are generally molded into the tire in the course of the vulcanization of the tire by means of a shape-imparting vulcanization mold which has a negative contour of the hatching area. A structured surface of an already vulcanized tire can however also be achieved by removal, for example by means of engraving, or by an additive process.

Such hatching areas are known. On the tire sidewall and/or on the tread, they are used for example to realize a marking. A marking may include images, characters, company names, company logos, designations, areas, etc. The hatching area may be part of the marking and/or may completely or partially surround the latter.

The scattering of light on the flanks of the hatching ribs reduces the reflection of the light on the surface of the tire, which changes the brightness effect. In general, surface regions provided with transverse elevations appear darker than substantially smooth surface regions that are free from such elevations. This make it possible to realize a contrast in the inherently monochrome surface of the tire, in particular of the sidewall and/or of the tread. Depictions of markings can thus be made more clearly visible.

For example, DE 10 2012 105 864 A1 has disclosed a pneumatic vehicle tire which, on its sidewall, has a multiplicity of hatching ribs for a high-contrast surface design and accentuation of a marking.

A disadvantage of such embodiments is that the design options are limited.

The problem addressed is therefore that of influencing the contrast effect in even more targeted fashion, and further increasing the contrast effect. It is furthermore sought to allow improved ventilation capability during the production of the tire by means of a vulcanization mold.

This is achieved in that each hatching element has short transverse elevations, which cross the hatching rib in crossing regions, wherein the short transverse elevations cross in each case exactly one hatching rib.

It has been found that a hatching element with short transverse elevations which cross the hatching rib in crossing regions produces a significantly stronger contrast effect than a hatching rib which is free from such crossing regions or short transverse elevations crossing it. Each short transverse elevation may extend to both sides of the hatching rib. The additional flanks of the short transverse elevations increase the scattering, the multiple reflection and the absorption of light that is incident on the hatching area. In addition, the flanks of the hatching ribs are interrupted by the short transverse elevations, which further increases the contrast. Multiple reflection on hatching elements that run adjacent to one another additionally intensifies the effect. In addition, the short transverse elevations create additional shadow effects which, particularly on the black rubber of the pneumatic vehicle tire, give rise to a clear accentuation of the hatching area in relation to the surrounding surface regions. Since the short transverse elevations each cross exactly one hatching rib, each short transverse elevation also has two free end regions, which cause additional scattering of the light in different directions.

By means of the hatching element with short transverse elevations crossing it, the contrast effect can thus be influenced and improved in an even more targeted manner.

The connection of the short transverse elevations and the hatching rib in the crossing regions also allows advantageous ventilation of the structure surface during the tire construction process. Furthermore, the short transverse elevations stabilize the hatching elements in the crossing regions, as a result of which the hatching elements are more resistant to scuff marks during use of the tire.

One advantageous embodiment is provided in that the hatching area has at least two adjacent hatching elements, the short transverse elevations of which are oriented parallel to one another, and in that the short transverse elevations of one adjacent hatching element are arranged offset, preferably centrally offset, relative to the short transverse elevations of the other adjacent hatching element.

Here, "arranged offset" means that the short transverse elevations of one adjacent hatching element, in the elongation thereof, intersect the other adjacent hatching element between two crossing regions. Here, "arranged centrally offset" means that the crossing region comprises at least the center between two crossing regions.

The offset arrangement of the short transverse elevations allows a particularly uniform distribution of the short transverse elevations in the case of a close arrangement.

It is expedient if all adjacent crossed hatching ribs are designed in this way.

One advantageous embodiment is provided in that the hatching ribs of the hatching elements are arranged with a spacing of 0.4 mm to 1.0 mm, preferably of 0.5 mm to 0.7 mm, particularly preferably of 0.55 mm to 0.60 mm.

Such a spacing of 0.4 mm to 1.0 mm, preferably of 0.5 mm to 0.7 mm, particularly preferably of 0.55 mm to 0.60 mm, makes an improved contrast effect possible with simultaneously low manufacturing outlay.

The spacing may be measured between areas that run perpendicular to the tire surface and along the ridges of the hatching ribs.

One advantageous embodiment is provided in that the crossing regions of at least one of the hatching elements are arranged with a spacing of 0.2 mm to 0.5 mm, preferably of 0.25 mm to 0.35 mm.

Such a spacing allows a sufficiently close arrangement of the short transverse elevations for an advantageous contrast effect, with simultaneously low manufacturing outlay. The advantages are further intensified if all crossed hatching ribs are designed in this way. The spacings may be measured between the center points of the crossing regions.

One advantageous embodiment is provided in that the longitudinal extent direction of at least one of the hatching ribs encloses an angle of 45° to 90°, preferably of 60° to 90°, particularly preferably of 90°, with the respective longitudinal extent direction of the short transverse elevations crossing it.

The angle influences the local density distribution on inclined flanks adjacent to crossing regions. In the case of an angle of less than 45°, however, the demolding of the tire is made more difficult. An angle of 60° to 90° allows an improved contrast effect with simultaneously good demoldability. The demoldability is further improved in the case of an angle of 90°.

It is also expedient if all short transverse elevations of a hatching element enclose the same angle with the respective hatching rib. This limits the number of directions to be engraved in order to generate the hatching area.

The advantages are further intensified if all hatching elements are designed in this way.

One advantageous embodiment is provided in that the hatching area has at least two adjacent hatching elements, between the short transverse elevations of which there is a clear spacing of at least 10%, preferably of at least 13%, of the spacing of the hatching ribs of the adjacent hatching elements.

The clear spacing is measured perpendicular to the longitudinal extent direction of the hatching elements. The clear spacing may be measured at a height H3 which corresponds to ⅓ of the mean value of the heights H of the two hatching ribs of the adjacent hatching elements.

It has been found that such a clear spacing further improves the demoldability. This also makes it possible to increase the multiple reflection of light on both of the adjacent hatching elements, as a result of which the contrast effect is further increased.

One advantageous embodiment is provided in that at least one of the hatching ribs has a height H of 0.1 mm to 0.8 mm, preferably of 0.2 mm to 0.5 mm, particularly preferably of 0.25 mm to 0.35 mm.

The height H of a hatching rib may be the height averaged along the longitudinal extent of the hatching rib. Heights may be measured relative to a level that corresponds to a mean level of the entire hatching base of the marking region. Heights may also be measured with respect to a level that corresponds to a base level that is formed, for example, by a part of the outer surface of the pneumatic vehicle tire, in particular a base of a shallow depression formed on the surface of the tire.

Mean values generally correspond to the arithmetic mean value.

In this way, favourable dimensioning for the benefit of producibility is achieved. It is particularly advantageous if several, preferably all, hatching ribs have a corresponding height H.

Furthermore, a good contrast effect can be achieved with such a depth, in particular in conjunction with a spacing of adjacent hatching ribs of 0.4 mm to 1.0 mm, preferably 0.5 mm to 0.7 mm, particularly preferably 0.55 mm to 0.60 mm.

One advantageous embodiment is provided in that at least one hatching element is designed such that the hatching rib of the hatching element has mutually opposite flanks which enclose an angle of at least 50°, preferably of 55° to 65°, with one another.

Such flank angles exhibit a good contrast effect. A corresponding negative shape of a molding tool such as a vulcanization mold can be created for example by means of laser engraving. The angle may be measured between the crossing regions. It is particularly advantageous if the mutually opposite flanks have such an angle over a height extent which corresponds to at least one quarter of the height H of the hatching rib.

The advantage is also or additionally intensified if several, preferably all, hatching ribs are formed in this way.

One advantageous embodiment is provided in that at least one of the hatching elements has a hatching rib and/or a short transverse elevation with in each case mutually opposite flanks which enclose an angle of 2° to 10°, preferably of 6° to 8°, with one another.

Multiple reflection and thus an improved contrast effect can be achieved with such a steep flank angle. A corresponding negative shape of a molding tool such as a vulcanization mold can be created by means of laser engraving of the molding tool. With regard to the hatching rib, the angle may be measured between two crossing regions. With regard to the short transverse elevation, the angle may be measured outside the crossing region. It is particularly advantageous if the mutually opposite flanks have such an angle over a height extent which corresponds to at least one quarter of the height H of the hatching rib. The advantage is also or additionally intensified if several, preferably all, hatching elements are formed in this way.

In one expedient embodiment, the hatching ribs each have mutually opposite flanks that enclose an angle of at least 50° with one another, and the short transverse elevations each have mutually opposite flanks that enclose an angle of 2° to 10°, preferably of 6° to 8°, with one another.

In another expedient embodiment, both the hatching ribs and the short transverse elevations each have mutually opposite flanks which enclose an angle of 2° to 10°, preferably of 6° to 8°, with one another.

It may also be expedient if the hatching ribs and/or the short transverse elevations have mutually opposite flanks which enclose an angle of 2° to 10°, preferably of 6° to 8°, with one another and have a mean width of 0.08 mm to 0.13 mm, preferably of 0.1 mm. The mean width is the arithmetic mean value of the width measured at different heights.

One advantageous embodiment is provided in that the short transverse ribs and/or the hatching ribs of at least two hatching elements, in particular of at least two adjacent hatching elements, differ from one another by at least 30° in terms of the angles enclosed by their flanks.

In this way, the hatching area can be further optimized with regard to the conflict of aims of resistance to scuff marks versus contrast.

It is expedient if adjacent hatching elements differ in that the angles that mutually opposite flanks of the hatching rib enclose with one another differ from one another by at least 30°. A particularly high flank density can be achieved in this way.

One advantageous embodiment is provided in that at least one of the hatching elements has a hatching rib and/or at least one short transverse elevation with a cross section which, in the region of at least one flank, has a convexly curved and/or a linear and/or a concavely curved and/or a stepped and/or a bent and/or a structured region.

The cross section runs outside a crossing region perpendicularly with respect to the longitudinal extent direction of the respective short transverse elevation or hatching rib. In this way, the contrast effect can be influenced in even more targeted fashion and the contrast effect can be further increased. The advantage is intensified if several, preferably all, crossed hatching ribs and/or short transverse elevations are formed in this way.

It is particularly advantageous if the correspondingly shaped region extends over a height extent which corresponds to at least one quarter of the height H of the hatching rib of the hatching element.

The hatching ribs and/or the short transverse elevations may transition into the hatching base at a bend or in curved fashion.

The cross section may be symmetrical.

The hatching ribs and/or the short transverse elevations of the crossed hatching ribs may have a flattened ridge. The ridge may comprise a plateau with a width of 0.03 mm to 0.06 mm. The ridge may also have irregularities in height which amount to a maximum of 5% of the height H.

Irrespective of the embodiment, the hatching area may have a hatching base that separates adjacent crossed hatching ribs and/or adjacent short transverse elevations from one another by means of the hatching base. A substantially flat hatching base is preferred.

One advantageous embodiment is provided in that at least one hatching element has short transverse elevations which slope downward continuously from the crossing region to a hatching base.

In this way, whilst achieving an advantageous support action of the short transverse elevations, the demoldability is simultaneously further improved.

In one preferred embodiment, the hatching area is formed on one of the sidewalls of the pneumatic vehicle tire.

In a further preferred embodiment, the hatching area is formed on the tread of the pneumatic vehicle tire. The hatching area may in particular also be applied to groove flanks and/or groove bases of grooves running in the tread, or at the tread outlet, that is to say at the shoulder flanks running outside the ground contact patch to the sidewalls, or on the outer surface of the tread, that is to say on treads that come into contact with the ground.

Further features, advantages and details of the invention will now be described in more detail on the basis of the drawing, which schematically shows exemplary embodiments of the invention. In the drawing.

Figure 1:
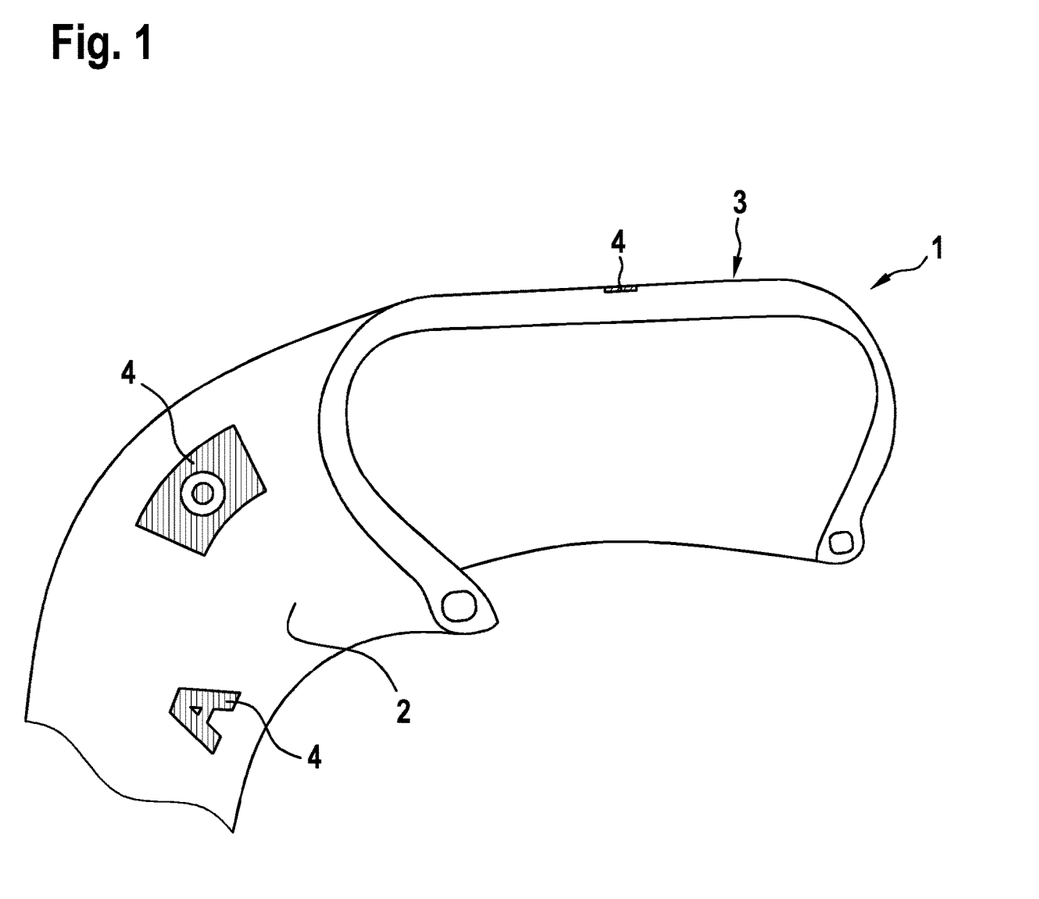
FIG. 1 shows a pneumatic vehicle tire 1 having a hatching area.

FIG. 1 shows a pneumatic vehicle tire 1 with sidewalls 2 and a tread 3 and with at least one hatching area 4 on at least one of the sidewalls 2 and/or on the tread 3. In the case of an arrangement on the tread 3, the hatching area may in particular also be applied to groove flanks and/or groove bases of grooves running in the tread 3, or at the tread outlet, that is to say at the shoulder flanks running outside the ground contact patch to the sidewalls, or on the outer surface of the tread, that is to say on treads that come into contact with the ground.

The hatching area 4 has at least two hatching elements 5 running adjacent to one another, each of which has a hatching rib 51 and short transverse elevations 53 crossing this hatching rib in crossing regions 52, wherein the short transverse elevations 53 each cross exactly one of the hatching ribs 51.

Figure 2:
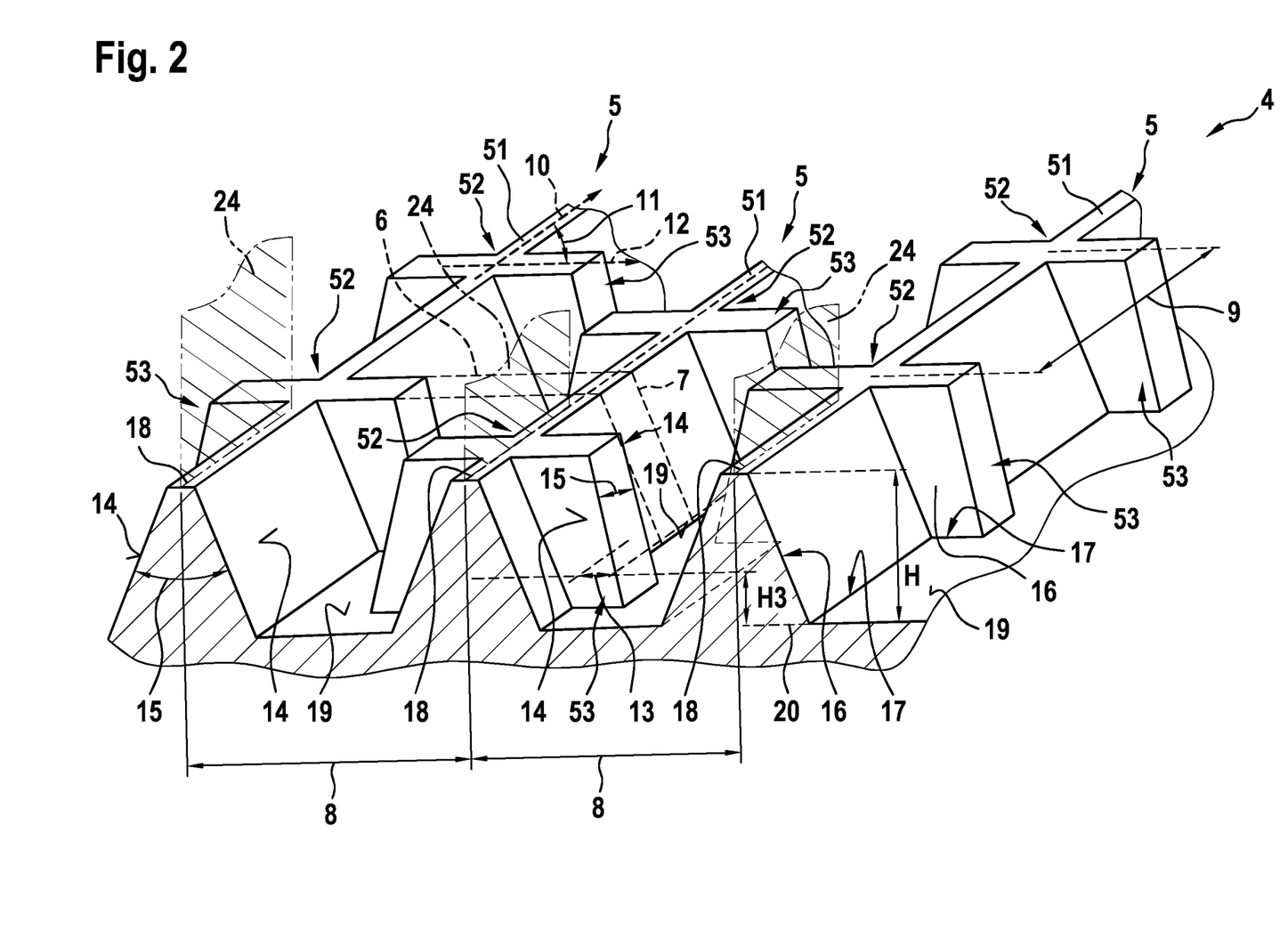
FIG. 2 shows a hatching area.

A design variant of such a hatching area 4 is shown in FIG. 2. The illustrated sectional view of the hatching area 4 has at least two adjacent hatching elements 5, the short transverse elevations 53 of which are oriented parallel to one another. The short transverse elevations 53 of one adjacent hatching element 5 are offset, preferably centrally offset, relative to the short transverse elevations 53 of the other adjacent hatching element 5.

The short transverse elevations 53 of the crossed hatching ribs 5, in the elongation 6 thereof, intersect the respectively adjacent hatching element 5 between two crossing regions 52. In the embodiment shown, the respective intersection region 7 comprises at least the center between two crossing regions 52.

The spacing 8 between the adjacent hatching elements 5 is 0.4 mm to 1.0 mm, preferably 0.5 mm to 0.7 mm, particularly preferably 0.55 mm to 0.60 mm. The spacing 8 may be measured between areas 24 which run perpendicular to the tire surface and along the ridges 18 of the adjacent hatching ribs 51.

The crossing regions 51 of the crossed hatching ribs 5 may be arranged with a spacing 9 of 0.2 mm to 0.5 mm, preferably of 0.25 mm to 0.35 mm. The spacing 9 may be measured between the center points of the crossing regions 51. In the example illustrated, all crossing regions 51 have approximately the same spacing 9.

A longitudinal extent direction 10 of the hatching elements 51 encloses in each case an angle 11 of 45° to 90°, preferably of 60° to 90°, particularly preferably of 90°, with a respective longitudinal extent direction 12 of the short transverse elevations 53 crossing them. An angle 11 of approximately 90° is illustrated in each case.

A clear spacing 13 between the short transverse elevations 53 of adjacent crossed hatching ribs 5 may be at least 10%, preferably at least 13%, of the spacing 8 of the adjacent hatching elements 5. The clear spacing 13 is measured perpendicular to the longitudinal extent direction 10 of the hatching elements 51. The clear spacing is measured at a height H3, which may be ⅓ of the mean value of the heights H of the hatching ribs 51 of the two adjacent hatching elements 5.

The hatching ribs 51 have a height H of 0.1 mm to 0.8 mm, preferably of 0.2 mm to 0.5 mm, particularly preferably of 0.25 mm to 0.35 mm, wherein the height H is averaged along the longitudinal extent of the respective hatching rib 51. The height H may be measured relative to a level 20 which corresponds to a mean level of a hatching base 19. The level 20 may also correspond to a base level that is formed, for example, by a part of the outer surface of the pneumatic vehicle tire, in particular a base of a shallow depression formed on the surface of the tire.

The hatching ribs 51 each have mutually opposite flanks 14 which enclose an angle 15 of at least 50°, preferably of 55° to 65°, with one another. The short transverse elevations 53 each have mutually opposite flanks 14 which enclose an angle 15 of 2° to 10°, preferably of 6° to 8°, with one another. It is particularly advantageous if the mutually opposite flanks have such a respective angle over a height extent which corresponds to at least one quarter of the height H of the hatching rib.

It is however also possible for both the hatching ribs 51 and the short transverse elevations 53 to each have mutually opposite flanks 14 which enclose an angle 15 of 2° to 10°, preferably of 6° to 8°, with one another.

The illustrated hatching ribs 51 and/or the short transverse elevations 53 have a cross section which, in the region of at least one flank, has a region 16 which runs linearly. As shown, this may transition into the hatching base 19 at a bend 17 or else in a curved manner.

The hatching ribs 51 and/or the short transverse elevations 53 of the crossed hatching ribs 5 may have a flattened ridge 18. The ridge may comprise a plateau with a width of 0.03 mm to 0.06 mm. The ridge 18 may also have irregularities in height which amount to a maximum of 5% of the maximum height difference of the hatching area.

The hatching area 4 may have a hatching base 19 which separates adjacent hatching elements 5 and/or adjacent short transverse elevations 53 from one another.

Figure 3:
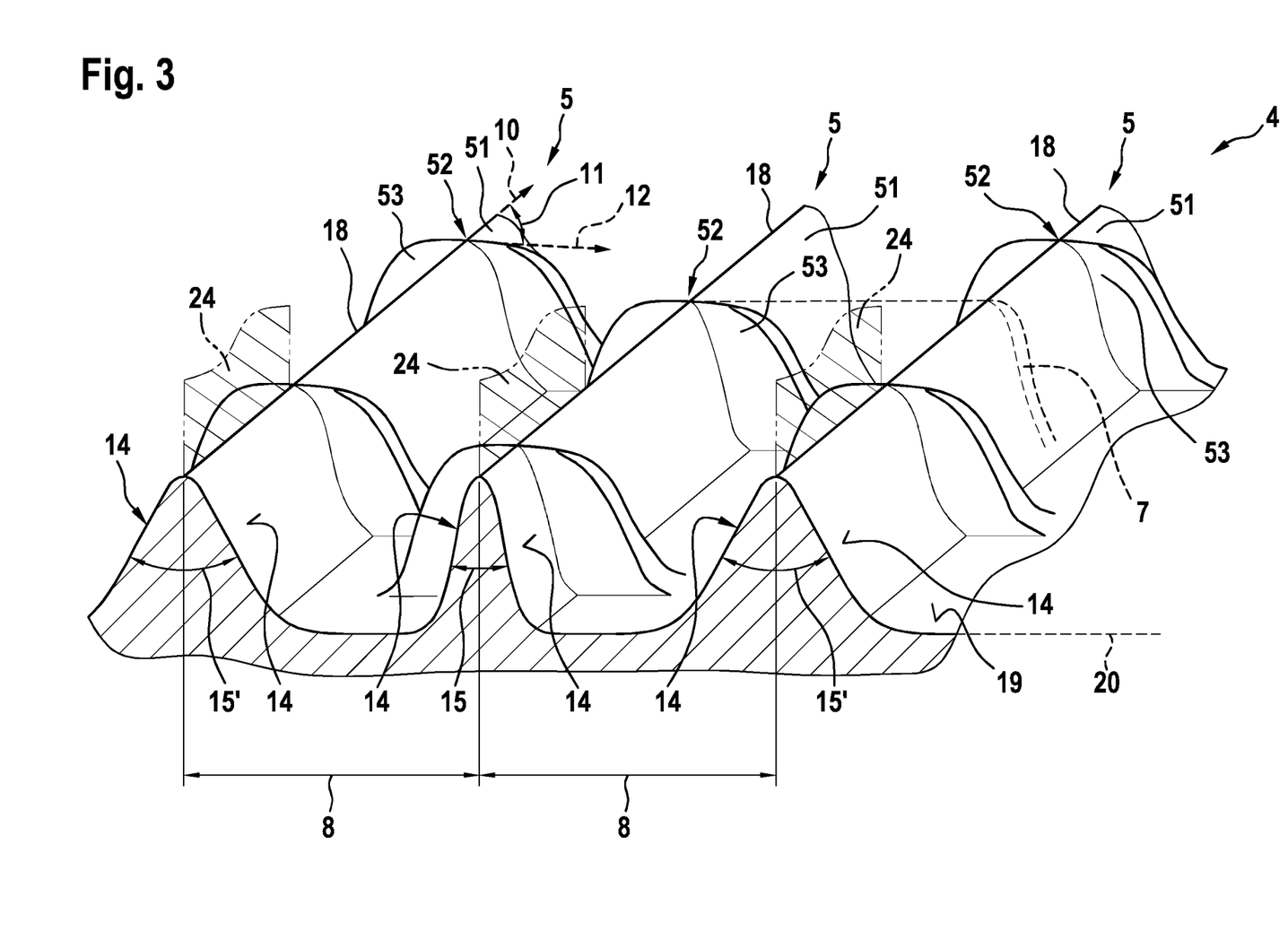
FIG. 3 shows a hatching area.

FIG. 3 shows a further exemplary embodiment according to the invention. It differs from the exemplary embodiment shown in FIG. 2 at least in that the short transverse elevations 53 slope downward continuously from the crossing region 52 to the hatching base 19. Furthermore, the flanks 14 of the hatching ribs 51 and of the short transverse elevations 53 transition into the hatching base 19 in a curve. Independently of this, the exemplary embodiments also differ by the fact that the hatching ribs 51 of at least two hatching elements 5, in particular of at least two adjacent hatching elements 5, differ from one another by at least 30° in terms of the angles 15, 15' enclosed by their flanks 14. The angle 15 may be 2° to 10°, preferably 6° to 8°, and the angle 15' may be at least 50°.

FIGS. 4a to 4g show examples of cross sections of the hatching ribs 51 and/or of the short transverse elevations 53 of a hatching element. The cross section runs in each case outside a crossing region 52 perpendicularly with respect to the longitudinal extent direction of the respective short transverse elevation 53 or hatching rib 51. The cross sections are suitable for the hatching areas 4 illustrated in FIGS. 2 and 3. Without restricting the general nature, the cross sections illustrated are symmetrical.

Figure 4A:
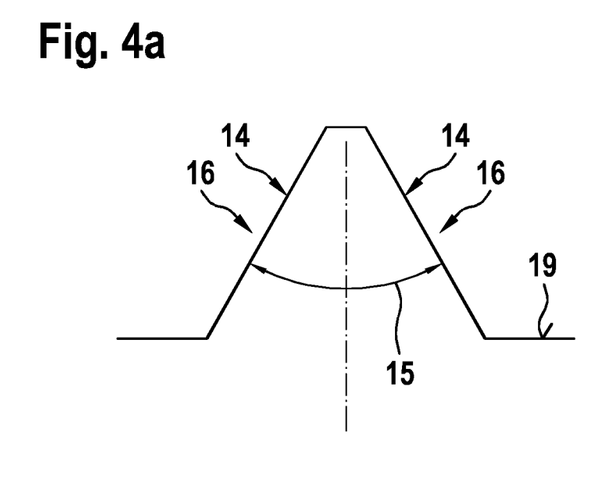
FIG. 4 shows examples of cross sections.

FIG. 4a shows a cross section which has a linearly running region 16 in the region of the flanks 14. The flanks 14 lie opposite one another and may enclose an angle 15 of at least 50°, preferably of 55° to 65°, with one another. The flanks 14 transition into the flat hatching base 19 at a bend.

Figure 4B:
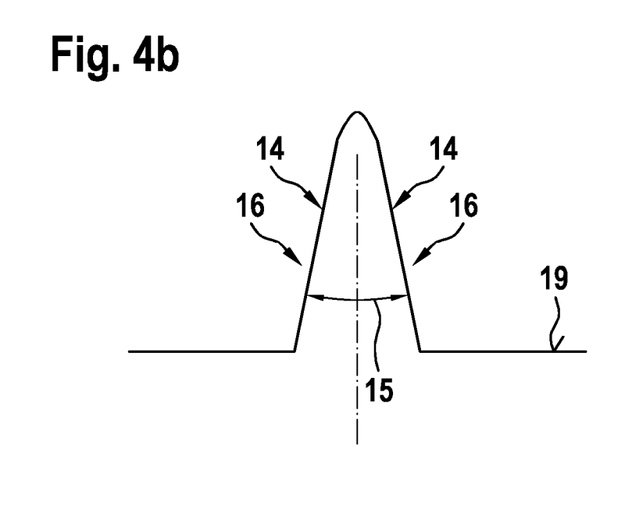

FIG. 4b shows a corresponding cross section, wherein the flanks 14 enclose an angle 15 of 2° to 10°, preferably of 6° to 8°, with one another.

Figure 4C:
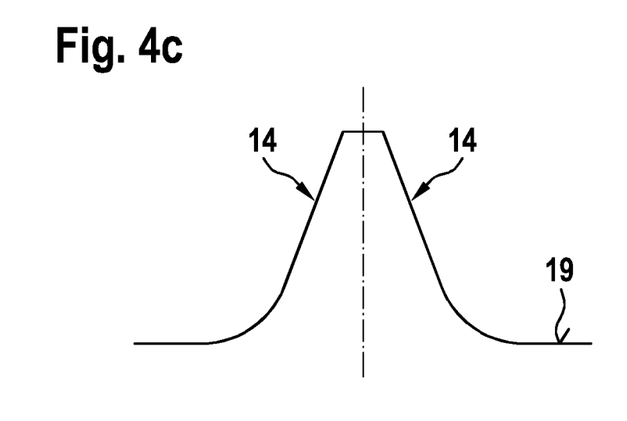

FIG. 4c shows by way of example that, irrespective of the exact design of the cross section, the flanks 14 may also transition into the hatching base 19 with a curvature.

Figure 4D:
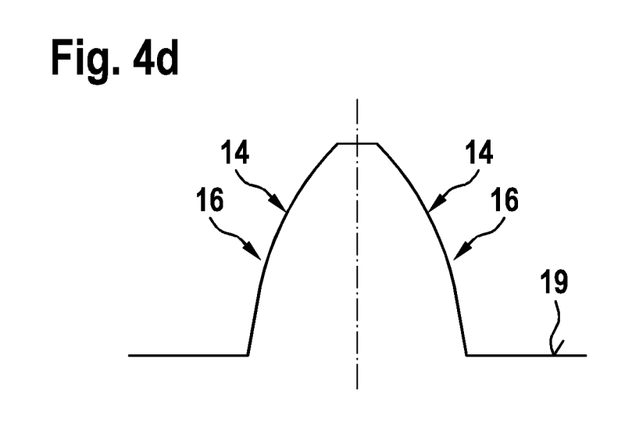
Figure 4E:
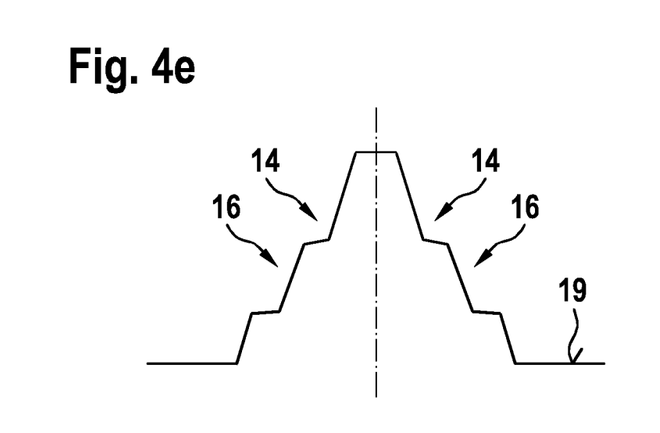

FIG. 4d shows a cross section which has a convexly curved region 16 in the region of the flanks 14. FIG. 4e shows a cross section which has a stepped region 16 in the region of the flanks 14.

Figure 4F:
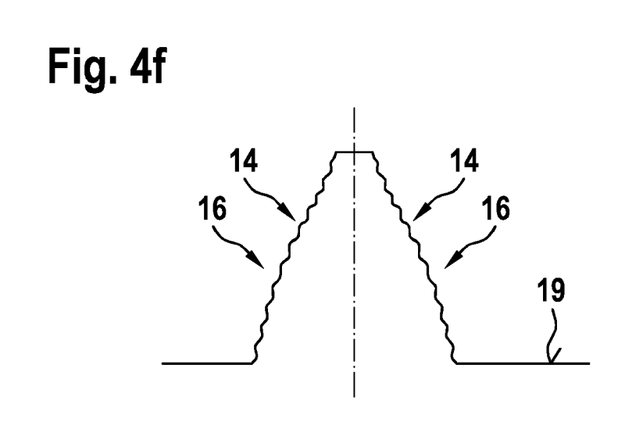
Figure 4G:
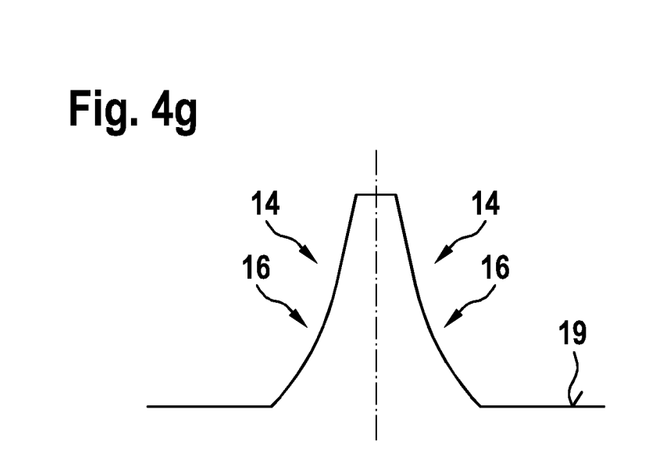

FIG. 4f shows a cross section which has a structured region 16 in the region of the flanks 14. FIG. 4g shows a cross section which has a concavely curved region 16 in the region of the flanks 14.

In all of FIGS. 4a to 4g, the correspondingly shaped region 16 may extend over at least one quarter of the height H of the hatching rib of the corresponding hatching element.

LIST OF REFERENCE SIGNS

1 Pneumatic vehicle tire
2 Sidewall
3 Tread
4 Hatching area
5 Crossed hatching rib
51 Hatching rib
52 Crossing region
53 Short transverse elevation
6 Elongation
7 Intersection point
8 Spacing of hatching ribs
9 Spacing of crossing regions
10 Longitudinal extent direction of a hatching rib
11 Angle
12 Longitudinal extent direction of a short transverse elevation
13 Clear spacing
14 Mutually opposite flanks
15 Angle
15' Angle
16 Region
17 Bent region
18 Ridge
19 Hatching base
20 Level
24 Area
H Height of a hatching rib
H3 Height

The invention claimed is:

1. A pneumatic vehicle tire comprising sidewalls and having a tread, and having at least one hatching area on at least one of the sidewalls and/or on the tread, wherein the hatching area has mutually adjacently arranged hatching elements,
   wherein each of the hatching elements has a hatching rib;
   wherein each of the hatching elements has a short transverse elevation which crosses the respective hatching rib in a crossing region, and wherein the short transverse elevation crosses in each case exactly one hatching rib;
   wherein at least one of the hatching elements has the hatching rib and/or the short transverse elevation with mutually opposite flanks which enclose an angle of 2° to 10° relative one another; and
   wherein the short transverse ribs and/or the hatching ribs of at least two of the hatching elements differ from one another by at least 30° in terms of the angles enclosed by their flanks.

2. The pneumatic vehicle tire as claimed in claim 1,
   wherein each hatching element includes only a single hatching rib that is elongated along a length, and includes a plurality of the short transverse elevations spaced apart along the length of the single hatching rib,
   wherein for each hatching element, each of the plurality of short transverse elevations has a longitudinal extent such that opposite end portions of the respective short transverse elevations protrude from opposite sides of the single hatching rib, and the longitudinal extent of each of the plurality of short transverse elevations is less than the length of the single hatching rib, and
   wherein for each hatching element, the single hatching rib only intersects with the plurality of short transverse elevations along its length, and the plurality of short transverse elevations only intersect with the single hatching rib.

3. The pneumatic vehicle tire as claimed in claim 1, wherein the hatching ribs of at least two of the hatching elements differ from one another by at least 30° in terms of the angles enclosed by their flanks.

4. The pneumatic vehicle tire as claimed in claim 1, wherein the respective short transverse elevations of at least two of the adjacent hatching elements are oriented to extend parallel to one another, and wherein the short transverse elevation of one of the adjacent hatching elements is arranged offset relative to the short transverse elevation of the other adjacent hatching element.

5. The pneumatic vehicle tire as claimed in claim 4, wherein each of the two adjacent hatching elements has at least two of the short transverse elevations spaced apart from each other by a distance along a length of the respective hatching rib, and one of the at least two short transverse elevations of the one adjacent hatching element is arranged centrally offset relative to two of the at least two short transverse elevations of the other adjacent hatching element such that an imaginary vertical plane extending through the one short transverse elevation of the one adjacent hatching bisects the distance between the two short transverse elevations of the other adjacent hatching element.

6. The pneumatic vehicle tire as claimed in claim 1, wherein the hatching ribs of the hatching elements are arranged with a spacing of 0.4 mm to 1.0 mm relative to each other.

7. The pneumatic vehicle tire as claimed in claim 1, wherein the hatching ribs of the hatching elements are arranged with a spacing of 0.5 mm to 0.7 mm relative to each other.

8. The pneumatic vehicle tire as claimed in claim 1, wherein the crossing region of at least one of the hatching elements is arranged with a spacing of 0.2 mm to 0.5 mm.

9. The pneumatic vehicle tire as claimed in claim 1, wherein a longitudinal extent direction of at least one of the hatching ribs encloses an angle of 60° to 90° with a respective longitudinal extent direction of the short transverse elevation crossing the at least one of the hatching ribs.

10. The pneumatic vehicle tire as claimed in claim 1, wherein a longitudinal extent direction of at least one of the hatching ribs encloses an angle of 90° with a respective longitudinal extent direction of the short transverse elevation crossing the at least one of the hatching ribs.

11. The pneumatic vehicle tire as claimed in claim 1, wherein the respective short transverse elevations of at least two of the adjacent hatching elements has a clear spacing therebetween of at least 10% of the spacing between the hatching ribs of the adjacent hatching elements.

12. The pneumatic vehicle tire as claimed in claim 1, wherein at least one of the hatching ribs has a height H of 0.1 mm to 0.8 mm.

13. The pneumatic vehicle tire as claimed in claim 1, wherein at least one of the hatching ribs has a height H of 0.2 mm to 0.5 mm.

14. The pneumatic vehicle tire as claimed in claim 1, wherein at least one of the hatching elements has the hatching rib and/or the short transverse elevation with a cross section which, in the region of at least one flank, has a concavely curved surface or a stepped surface.

15. The pneumatic vehicle tire as claimed in claim 1, wherein at least one hatching element has the short transverse elevation slope downward in a continuous curve from the crossing region to a hatching base.

16. The pneumatic vehicle tire as claimed in claim 1,
wherein each hatching element includes only a single hatching rib that is elongated along a length, and includes a plurality of the short transverse elevations spaced apart along the length of the single hatching rib,
wherein for each hatching element, each of the plurality of short transverse elevations has a longitudinal extent such that opposite end portions of the respective short transverse elevations protrude from opposite sides of the single hatching rib, and the longitudinal extent of each of the plurality of short transverse elevations is less than the length of the single hatching rib,
wherein for each hatching element, the single hatching rib only intersects with the plurality of short transverse elevations along its length, and the plurality of short transverse elevations only intersect with the single hatching rib,
wherein a longitudinal extent direction of at least one of the hatching ribs encloses an angle of 60° to 90° with a respective longitudinal extent direction of the short transverse elevation crossing the respective single hatching ribs, and
wherein the hatching ribs of the hatching elements are arranged with a spacing of 0.4 mm to 1.0 mm relative to each other.

17. A pneumatic vehicle tire comprising sidewalls and having a tread, and having at least one hatching area on at least one of the sidewalls and/or on the tread, wherein the hatching area has mutually adjacently arranged hatching elements,
wherein each of the hatching elements has a hatching rib;
wherein each of the hatching elements has a short transverse elevation which crosses the respective hatching rib in a crossing region, and wherein the short transverse elevation crosses in each case exactly one hatching rib;
wherein at least one of the hatching elements has the hatching rib and/or the short transverse elevation with mutually opposite flanks which enclose an angle of 2° to 10° relative one another;
wherein the short transverse ribs differ from the hatching ribs by at least 30° in terms of the angles enclosed by their flanks.

18. A pneumatic vehicle tire comprising sidewalls and having a tread, and having at least one hatching area on at least one of the sidewalls and/or on the tread, wherein the hatching area has mutually adjacently arranged hatching elements,
wherein each of the hatching elements has a hatching rib;
wherein each of the hatching elements has a short transverse elevation which crosses the respective hatching rib in a crossing region and wherein the short transverse elevation crosses in each case exactly one hatching rib;
wherein the short transverse elevation of the at least one hatching element has its mutually opposite flanks enclose an angle of 2° to 10° relative to one another, and wherein the hatching rib of the at least one hatching element has its mutually opposite flanks enclose an angle of at least 50° relative one another.

* * * * *